US009021460B2

(12) United States Patent
Yoshida (10) Patent No.: US 9,021,460 B2
(45) Date of Patent: Apr. 28, 2015

(54) SOFTWARE MANAGEMENT SYSTEM (75) Inventor: Ryoji Yoshida, Tokyo (JP)

(73) Assignee: NEC Corporation, Tokyo (JP)

(*) Notice: Subject to any disclaimer, the term of this patent is extended or adjusted under 35 U.S.C. 154(b) by 473 days.

(21) Appl. No.: 13/358,452

(22) Filed: Jan. 25, 2012

(65) Prior Publication Data
US 2012/0204167 A1 Aug. 9, 2012

(30) Foreign Application Priority Data

Feb. 3, 2011 (JP) ................ P2011-021496

(51) Int. Cl.
G06F 9/44 (2006.01)
G06F 9/445 (2006.01)

(52) U.S. Cl.
CPC ........................ G06F 8/65 (2013.01)

(58) Field of Classification Search
CPC ............... G06F 8/65; G06F 8/61; G06F 8/70; G06F 8/71; G06F 11/1433
See application file for complete search history.

(56) References Cited

U.S. PATENT DOCUMENTS

| 6,493,871 | B1* | 12/2002 | Welch et al. | 717/173 |
| 6,681,390 | B2* | 1/2004 | Fiske | 717/173 |
| 8,510,732 | B2* | 8/2013 | Chevrette et al. | 717/176 |
| 8,789,035 | B2* | 7/2014 | McCarthy et al. | 717/171 |
| 8,904,374 | B2* | 12/2014 | Nakamura | 717/171 |
| 2003/0182414 | A1* | 9/2003 | O'Neill | 709/223 |
| 2003/0195949 | A1* | 10/2003 | Slivka et al. | 709/219 |
| 2005/0010915 | A1* | 1/2005 | Chen | 717/170 |
| 2005/0144612 | A1* | 6/2005 | Wang et al. | 717/168 |
| 2006/0130046 | A1* | 6/2006 | O'Neill | 717/168 |
| 2007/0245333 | A1* | 10/2007 | Ferlitsch | 717/168 |
| 2007/0294684 | A1* | 12/2007 | Kumashiro et al. | 717/168 |

(Continued)

FOREIGN PATENT DOCUMENTS

| JP | 2002-175237 | 6/2002 |
| JP | 2007-080167 A | 3/2007 |

(Continued)

OTHER PUBLICATIONS

Rahul Agarwal et al.; Designing an Adaptive Learning Module to Teach Software Testing; ACM 2006; retrieved online on Dec. 19, 2014; pp. 259-263; Retrieved from the Internet: <URL: http://delivery.acm.org/10.1145/1130000/1121420/p259-agarwal.pdf?ip=151.207.250.51&>.*

(Continued)

Primary Examiner — Thuy Dao
Assistant Examiner — Hanh T Bui
(74) Attorney, Agent, or Firm — McGinn IP Law Group, PLLC (57) ABSTRACT A software management system provides a software management device which manages a plurality of software programs installed in a plurality of managed devices in connection with a plurality of software-updating module delivery devices. The software management device receives adaptive version data from the managed device and current version data from the software-updating module delivery device. When the current version of software, indicated by current version data, is later than the adaptive version of software, indicated by adaptive version data, the software management device downloads software-updating modules from the software-updating module delivery device, thus updating the adaptive version of software installed in the managed device by use of software-updating modules.

7 Claims, 7 Drawing Sheets

(56) References Cited

U.S. PATENT DOCUMENTS

| | | | |
|---|---|---|---|
| 2008/0134162 A1* | 6/2008 | James et al. | 717/168 |
| 2008/0295087 A1* | 11/2008 | Kang et al. | 717/168 |
| 2009/0217256 A1* | 8/2009 | Kim | 717/168 |
| 2010/0087181 A1* | 4/2010 | Chen et al. | 455/418 |
| 2011/0093841 A1* | 4/2011 | Meller et al. | 717/168 |
| 2011/0107323 A1* | 5/2011 | Hong | 717/173 |
| 2011/0113418 A1* | 5/2011 | McCurdy et al. | 717/170 |
| 2011/0113420 A1* | 5/2011 | Ewington et al. | 717/171 |
| 2011/0179405 A1* | 7/2011 | Dicks et al. | 717/168 |
| 2011/0296398 A1* | 12/2011 | Vidal et al. | 717/171 |
| 2012/0030665 A1* | 2/2012 | Mccarthy et al. | 717/171 |
| 2014/0109073 A1* | 4/2014 | Fawcett | 717/168 |
| 2014/0189672 A1* | 7/2014 | Raundahl Gregersen et al. | 717/168 |
| 2014/0196020 A1* | 7/2014 | Shetty et al. | 717/171 |
| 2014/0304698 A1* | 10/2014 | Chigurapati et al. | 717/171 |

FOREIGN PATENT DOCUMENTS

| | | |
|---|---|---|
| JP | 2009-193218 | 8/2009 |
| JP | 2009-245397 A | 10/2009 |

OTHER PUBLICATIONS

Han Chockler et al.; PINCETTE—Validating Changes and Upgrades in Networks Software; IEEE 2013; retrieved online on Dec. 19, 2014; pp. 461-464; Retrieved from the Internet: <URL: http://ieeexplore.ieee.org/stamp/stamp.jsp?tp=&arnumber=6498511>.*

Coline Price and Elizabeth Coulter-Smith; Developing a Theory and Practise of Pervasive Information Capture, Processing, Visualization and Documentation; ACM 2005; retrieved online on Dec. 19, 2014; pp. 96-102; Retrieved from the Internet: <URL: http://delivery.acm.org/10.1145/1090000/1085337/p96-price.pdf?ip=151.207.250.51&id=1085337&acc=ACTIVE%20S>.*

Japanese Office Action dated Jan. 15, 2013 with English translation.

* cited by examiner

| SOFTWARE ID | SOFTWARE NAME | ADDRESS | ADAPTIVE VERSION | MANAGED DEVICE ID |
|---|---|---|---|---|
| SW001 | ZoomText | http://... | 9.1 | PC0928<br>PC1039<br>PC2140<br>... |
| SW002 | OPERATE NAVIGATION | http://... | 3.0 | PC0415<br>PC1526<br>PC2637<br>... |
| SW003 | WA7500H FIRMWARE | http://... | 7.57 | PC0108<br>PC1219<br>PC2320<br>... |
| ... | | | ... | ... |

| SOFTWARE ID | SOFTWARE NAME | CURRENT VERSION | SOFTWARE-UPDATING MODULE |
|---|---|---|---|
| SW001 | ZoomText | 9.2 | ZT92.zip |
| SW002 | OPERATE NAVIGATION | 3.0 | ON30.zip |
| SW003 | XB8600 FIRMWARE | 7.58 | WA7500HFW758.zip |
| ⋮ | ⋮ | ⋮ | ⋮ |

| SOFTWARE ID | SOFTWARE NAME | SOFTWARE-UPDATING MODULE |
|---|---|---|
| SW001 | ZoomText | ZT92.zip |
| SW003 | XB8600 FIRMWARE | WA7500HFW758.zip |
| SW004 | DVD for N | DVDN100.zip |
| ⋮ | ⋮ | ⋮ |

FIG. 8

SOFTWARE MANAGEMENT SYSTEM

BACKGROUND OF THE INVENTION

1. Field of the Invention

The present invention relates to a software management system that manages software programs installed in managed devices, and in particularly to a software management device that is able to update software programs of managed devices by downloading software-updating modules via communication lines.

The present application claims priority on Japanese Patent Application No. 2011-21496 filed Feb. 3, 2011, the entire content of which is incorporated herein by reference.

2. Description of the Related Art

In general, software programs are updated to fix minor drawbacks and to slightly improve their functionality by implementing software-updating modules having relatively small sizes. For this reason, authorized users are allowed to download software-updating modules via the Internet without payment or with payment of a fee.

Information systems installed in large companies involve numerous computers, causing congested access to servers for distributing software-updating modules, wherein a very high load of processing may be imparted to networks connecting between servers and computers.

As a technology for solving this problem, a management server can be arranged in the information system of a company to download software-updating modules so as to distribute them to computers.

In this technology, however, the management server of an information system simply manages the types of software installed in computers but does not manage the versions of software actually applied to computers. For this reason, the management server is designed to normally download all the software-updating modules with respect to computers irrespective of the status as to whether or not software-updating modules have been already applied to computers. In other words, this technology may download unnecessary software-updating modules which have been already applied to computers, thus causing an additional load of processing to networks or storages.

There is another technology, namely a software resource delivery technology, applied to a client server system with a three-layer structure consisting of a host server, an intermediate server, and a client. Patent Document 1 (i.e. Japanese Patent Application Publication No. 2007-80167) discloses a software resource delivery system that implements an efficient and highly-reliable delivery of current software resources to a client via a network system with a limited networking function which is unable to deliver data from a host server to an intermediate server or client. In this system, the intermediate server retrieves software resources stored in the host server so as to store them in a memory. The intermediate server monitors the updated conditions of software resources stored in the host server so as to update software resources, stored in the memory, with current software resources. Subsequently, the intermediate server notifies the client of the updated events of software resources. The client retrieves software resources, which need to be installed therein, from among software resources stored in the intermediate server so as to store them in the memory. Upon receipt of an update notice pertaining to a certain software resource, the client reads a currently updated software resource from the intermediate server so as to update the software resource stored in the memory.

The software resource delivery system of Patent Document 1 updates software resources with a client upon receiving a notification of update information from an intermediate server or upon checking update information when it starts operation. This prevents the client from carrying out erroneous operation using old software.

In the software resource delivery system of Patent Document 1, the intermediate server manages the types of software actually utilized by the client. For this reason, this system is very helpful to an information system which uniformly installs software to clients.

In the software resource delivery system of Patent Document 1, however, the intermediate server does not manage the types of software utilized by clients in real time. This system is not beneficial to another information system which does not uniformly install software to clients. Additionally, this system is not able to handle software programs which users install to clients without notices to system administrators, or drivers of peripheral devices.

SUMMARY OF THE INVENTION

It is an object of the present invention to provide a software management system that is able to manage and update any types of software programs installed in managed devices (e.g. clients) by streamlining the downloading of software-updating modules.

The present invention provides a software management system including a plurality of managed devices, a plurality of software-updating module delivery devices, and a software management device that manages a plurality of software programs installed in the plurality of managed devices. When the software management device receives adaptive version data, indicating the adaptive version of software installed in the managed device, from the managed device, the software management device downloads software-updating modules for updating the adaptive version of software installed in the managed device from the software-updating module delivery device.

Additionally, the software management device acquires current version data, indicating the current version of software pertaining to the adaptive version of software installed in the managed device, from the software-updating module delivery device. The software management device makes a decision as to whether or not the current version of software is later than the adaptive version of software. When the decision result indicates that the cu ent version of software is later than the adaptive version of software, the software management device downloads software-updating modules, which update the adaptive version of software with the current version of software in the managed device, from the software-updating module delivery device.

The present invention also provides a control method for controlling the software management device by implementing a step of receiving adaptive version data from the managed device, and a step of downloading software-updating modules from the software-updating module delivery device.

The present invention further provides a software management program causing a computer to execute the step of receiving adaptive version data from the managed device, and the step of downloading software-updating modules from the software-updating module delivery device.

Upon receiving adaptive version data from the managed device, the software management device downloads software-updating modules from the software-updating module delivery device so as to update the adaptive version of software installed in the managed device. The software management device may download software-updating modules from the software-updating module delivery device only when the current version of software, indicated by current version data, is later than the adaptive version of software. Alternatively, the software management device may receive a delivery request from the managed device so as to selectively download software-updating modules from the software-updating module delivery device whose address is specified in connection with the managed device making the delivery request. Thus, the software management system may demonstrate a high degree of freedom in downloading software-updating modules from delivery sources and efficiently obtain software-updating modules suited to any types of software programs installed in managed devices.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
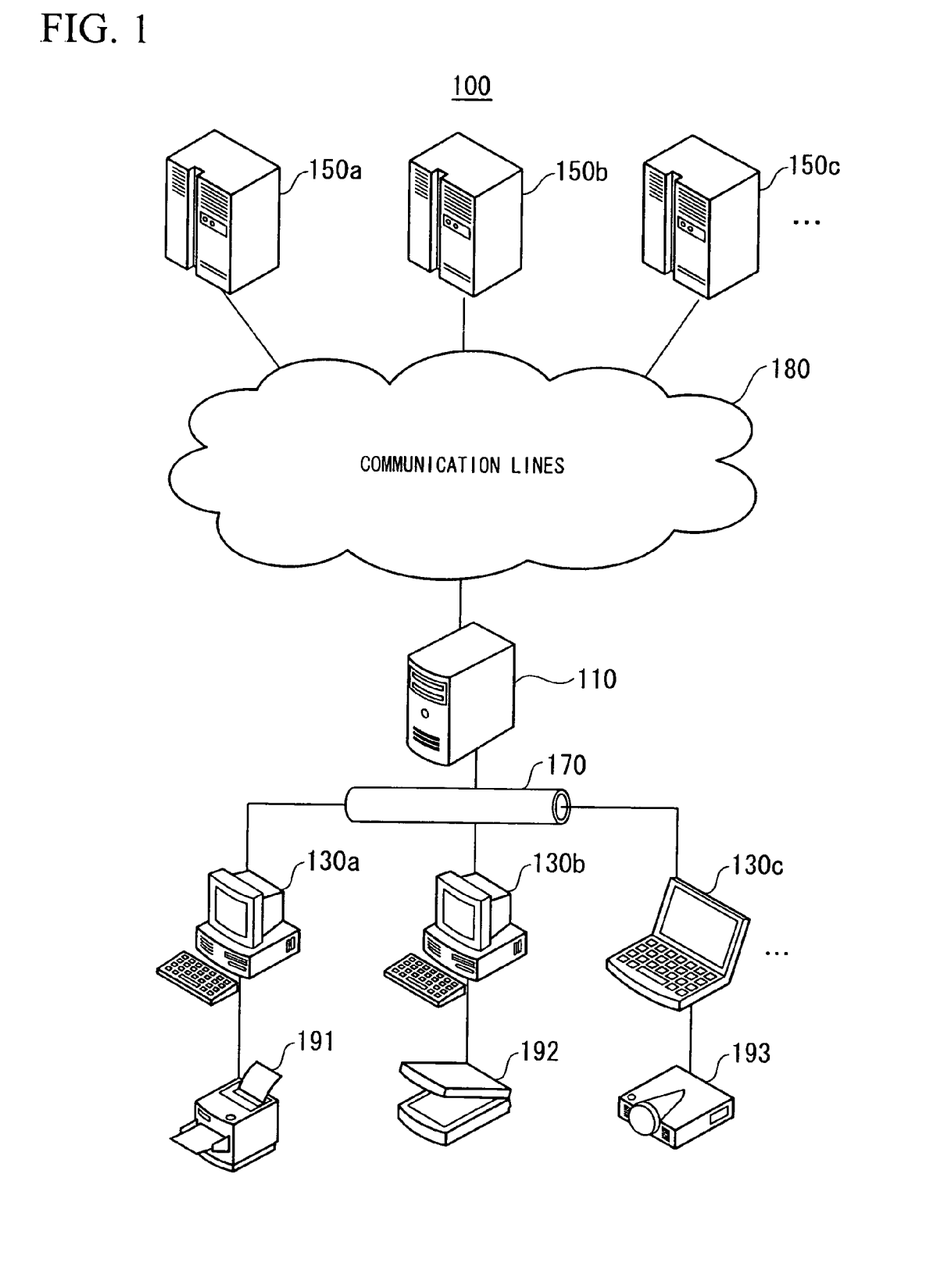
FIG. 1 is a schematic illustration of an operating environment for a software management system according to a preferred embodiment of the present invention.

FIG. 1 shows an operating environment for a software management system 100 according to a preferred embodiment of the present invention. The software management system 100 manages a plurality of software programs installed in a plurality of managed devices (e.g. computers, clients) 130 (i.e. 130a, 130b, and 130c shown in FIG. 1).

The software management system 100 includes a software management device 110 which is connected to the managed devices 130 via a LAN (i.e. Local Area Network) 170. Additionally, the software management device 110 is connected to a plurality of software-updating module delivery devices 150 (i.e. 150a, 150b, and 150c shown in FIG. 1) via communication lines 180. The software-updating module delivery devices 150 deliver software-updating modules to update software programs or device drivers. The LAN 170 is a network that connects computers, communication devices, and peripheral devices (e.g, printers), located in the same building, via cables or via wireless communication, thus handling transmission of data therebetween. In this connection, the communication lines 180 may embrace computer networks (e.g. the Internet), core networks of common communication carriers, and various types of local networks.

The managed device 130a is connected to a printer 191, i.e. a device which prints character data, image data, or figure data, created by a computer, on OHP sheets (where OHP stands for Overhead Projector) or the like. Specifically, the printer 191 may be either an impact printer which strikes an ink ribbon on paper with a print head or a non-impact printer, which print characters or images on paper by way of another printing method, such as a thermal transfer printer, an ink jet printer, and a laser printer.

The managed device 130b is connected to a scanner 192, i.e. a device which reads photographs or figures from paper so as to send image data to the managed device 130b. Specifically, the scanner 192 projects light on a scanned object such as paper and receives reflected light with a CCD (i.e. Charge-Coupled Device), thus producing digital data. The scanner 192 may be either a flat head scanner which operates similarly to a photocopier and scans a fixed manuscript by moving its reading head or a hand scanner which operates similarly to a barcode reader of a POS system (where POS stands for Point Of Sales) and scans a fixed manuscript by use of a manually movable reading heat.

The managed device 130c is connected to a liquid crystal projector 193, i.e. a device which projects or displays images by use of liquid crystal panels. Specifically, the liquid crystal projector 193 is designed such that three light beams emitted from light sources pass through three liquid crystal panels, colored red, green, and blue, and then converged at a specific location via a prism so that converged light is projected on the screen via a projector lens. The managed device 130c adopts a display interface that may accommodate a D-Sub (i.e. D-Subminiature) 15-pin analog input, a digital input, or a component input.

To avoid complicated explanation, the software management system 100 of the present embodiment includes a single software management device 100; however, the software management system 100 may include a plurality of software management devices 110.

Figure 2:
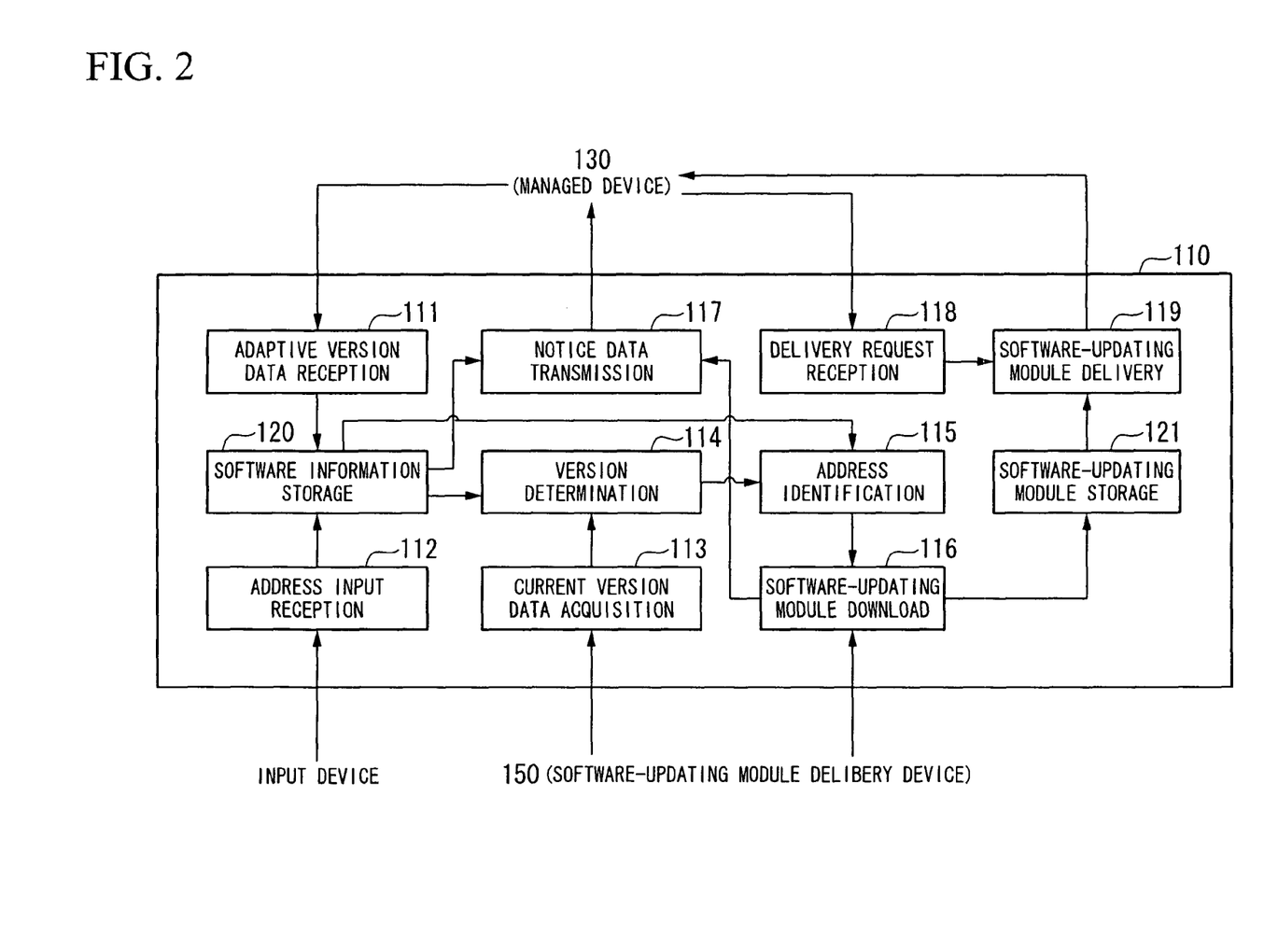
FIG. 2 is a block diagram of a software management device included in the software management system of FIG. 1.

FIG. 2 is a block diagram of the software management device 110, which includes an adaptive version data reception part 111, an address input reception part 112, a current version data acquisition part 113, a version determination part 114, an address identification part 115, a software-updating module download part 116, a notice data transmission part 117, a delivery request reception part 118, a software-updating module delivery part 119, a software information storage 120, and a software-updating module storage 121.

The adaptive version data reception part 111 receives adaptive version data, representing adaptive versions of software programs installed in the managed devices 130, so as to store them in the software information storage 120.

The address input reception part 112 receives addresses of delivery sources, which deliver software-updating modules for updating software programs installed in the managed devices 130, from an input device so as to store them in the software information storage 120.

The current version data acquisition part 113 receives current version data, representing the current versions of software which can be realized using current software-updating modules, from the software-updating module delivery devices 150 so as to send them to the version determination part 114.

Upon receiving current version data from the current version acquisition part 113, the version determination part 114 refers to adaptive version data stored in the software information storage 120 so as to make a decision as to whether or not current versions of software (indicated by current version data acquired by the current version data acquisition part 113) are later than adaptive versions of software (indicated by adaptive version data received by the adaptive version data reception part 111). Subsequently, the version determination part 115 sends its decision result to the address identification part 115.

Upon receiving a decision result, indicating that current versions of software are later than adaptive versions of software, from the version determination part 114, the address identification part 115 specifies addresses of delivery sources, which deliver software-updating modules for updating software programs whose current versions are deemed later than adaptive versions, with reference to the software information storage 120. Subsequently, the address identification part 115 sends addresses to the software-updating module download part 116.

Upon receiving addresses of delivery sources, which deliver software-updating modules for updating software programs whose current versions are deemed later than adaptive versions, from the address identification part 115, the software-updating module download part 116 downloads software-updating modules from the software-updating module delivery devices 150 specified by the addresses of delivery sources. Subsequently, the software-updating module download part 116 stores software-updating modules in the software-updating module storage 121. Additionally, the software-updating module download part 116 sends completion data, indicating completion of downloading software-updating modules, to the notice data transmission part 117.

Upon receiving completion data from the software-updating module download part 116 the notice data transmission part 117 produces notice data, indicating completion of preparing software-updating modules for updating software programs installed in the managed devices 130, with reference to the software information storage 120, thus sending notice data to the managed devices 130 whose software programs need to be updated.

The delivery request reception part 118 receives delivery requests of software-updating modules from the managed devices 130 so as to send them to the software-updating module delivery part 119.

Upon receiving delivery requests from the delivery request reception part 118, the software-updating module delivery part 119 reads software-updating modules, indicated by delivery requests, from the software-updating module storage 121 so as to deliver them to the managed devices 130 making delivery requests.

Figure 3:
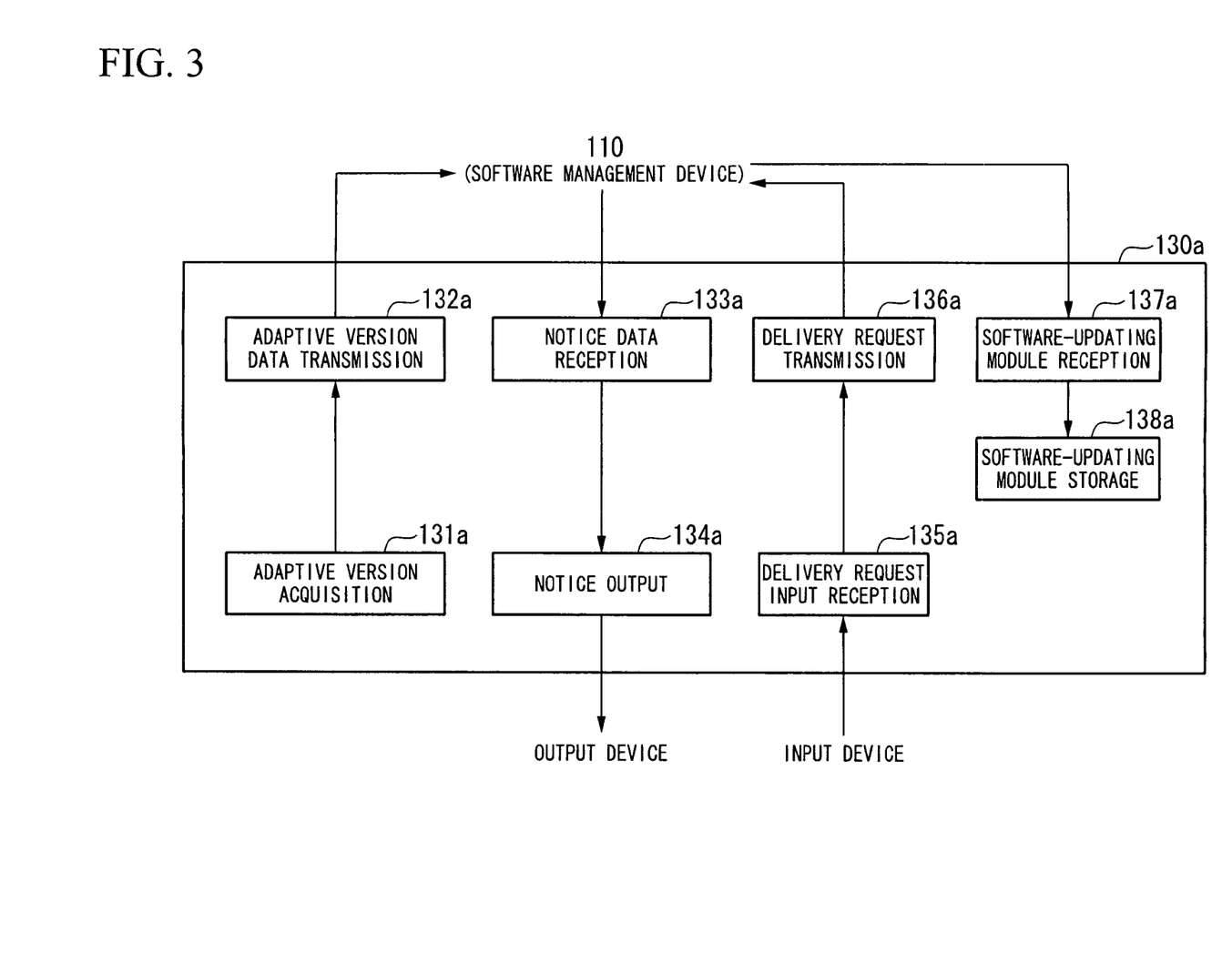
FIG. 3 is a block diagram of a managed device which is managed by the software management device.

FIG. 3 is a block diagram of the managed device 130a, which includes an adaptive version acquisition part 131a, an adaptive version data transmission part 132a, a notice data reception part 133a, a notice output part 134a, a delivery request input reception part 135a, a delivery request transmission part 136a, a software-updating module reception part 137a, and a software-updating module storage 138a. The other managed devices 130b, 130c have the same configuration as the managed device 130a. As shown in FIG. 3, the constituent elements of the managed device 130a are designated using numerals 131-138 plus a suffix "a". Similarly, the constituent elements of the managed device 130b are designated using numerals 131-138 plus a suffix "b", whilst the constituent elements of the managed device 130c are designated using numerals 131-138 plus a suffix "c". In short, the managed device 130 (representing the managed devices 130a, 130b, and 130c) includes the constituent elements 131-138 without using suffixes.

Next, the functions and operations of the constituent elements of the managed device 130 will be described in detail. The adaptive version acquisition part 131 acquires the version of software installed in the managed device 130 so as to send adaptive version data to the adaptive version transmission part 132.

Upon receiving adaptive version data, representing the version of software installed in the managed device 130, from the adaptive version acquisition part 131, the adaptive version data transmission part 132a sends adaptive version data to the software management device 110.

The notice data reception part 133a receives notice data, indicating completion of preparing software-updating modules for updating software programs installed in the managed device 130, from the software management device 110 so as to send notice data to the notice output part 134.

Upon receiving notice data from the notice data reception part 133, the notice output part 134 sends the content of notice data to an output device such as a display.

The delivery request input reception part 135 receives a delivery request, which requests delivery of software-updating modules for updating software programs, input by an input device such as a keyboard, thus sending it to the delivery request transmission part 136.

Upon receiving the delivery request from the delivery request input reception part 135, the delivery request transmission part 136 transmits the delivery request to the software management device 110.

Upon receiving software-updating modules from the software management device 110, the software-updating module reception part 137 stores them in the software-updating module storage 138.

Figure 4:
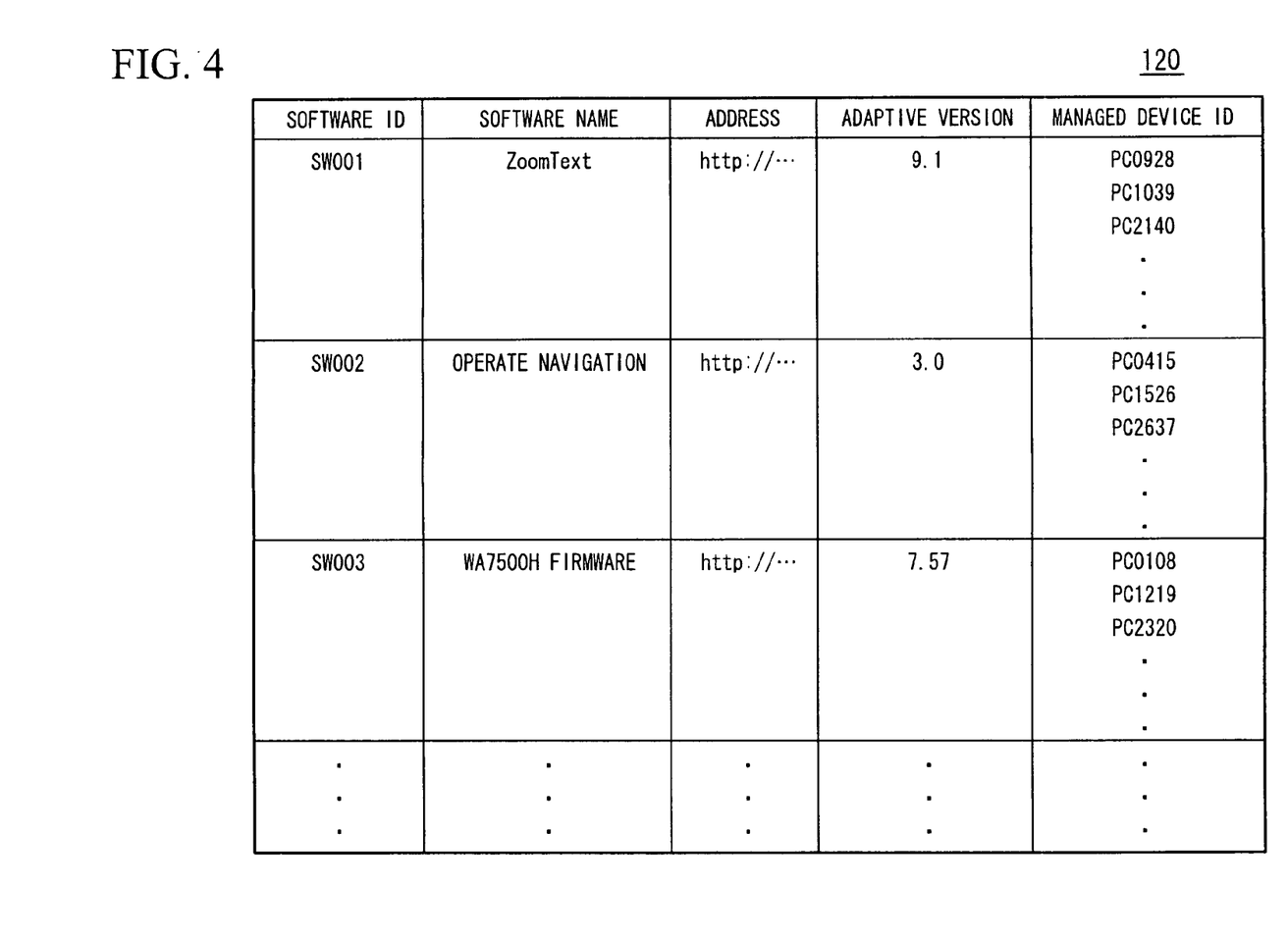
FIG. 4 shows an example of information stored in a software information storage included in the software management device.

FIG. 4 shows an example of information stored in the software information storage 20 in a table form. The software information storage 120 stores a plurality of information elements in connection with various items, i.e. "SOFTWARE ID" (where ID stands for Identifier), "SOFTWARE NAME", "ADDRESS", "ADAPTIVE VERSION", and "MANAGED DEVICE ID".

The "SOFTWARE ID" indicates identification codes for univocally identifying software programs installed in the managed devices 130. The "SOFTWARE NAME" indicates the names of software programs identified by software IDs. The "ADDRESS" indicates URLs (Uniform Resource Locators) serving as delivery sources of software-updating modules for updating software programs identified by software IDs. The "ADAPTIVE VERSION" indicates versions of software programs, identified by software IDs, which have been already applied to the managed device 130. The "MANAGED DEVICE ID" indicates identification codes for univocally identifying the managed devices 130 which install software programs identified by software IDs.

Figure 5:
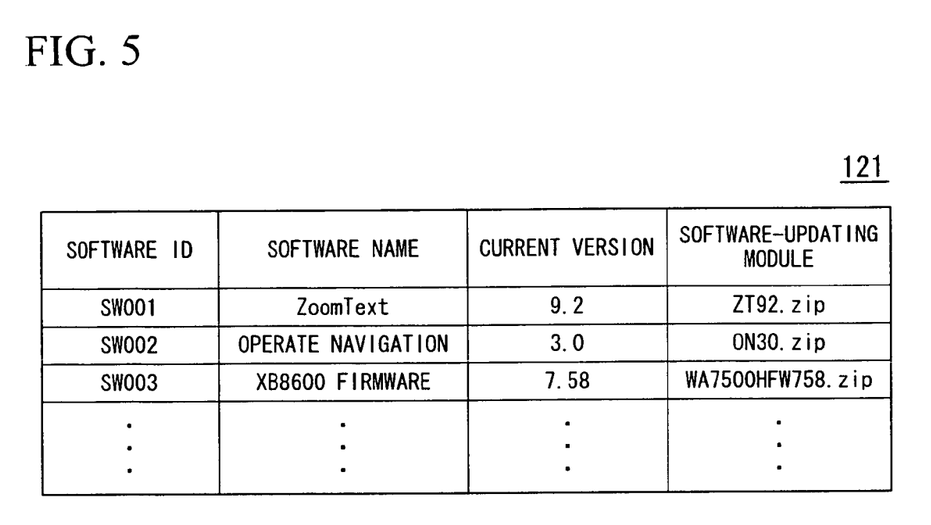
FIG. 5 shows an example of information stored in a software-updating module storage included in the software management device.

FIG. 5 shows an example of information stored in the software-updating module storage 121 in a table form. The software-updating module storage 121 stores a plurality of information elements in connection with various items, i.e. "SOFTWARE ID", "SOFTWARE NAME", "CURRENT VERSION", and "SOFTWARE-UPDATING MODULE".

The "SOFTWARE ID" indicates identification codes for univocally identifying software programs installed in the managed devices 130. The "SOFTWARE NAME" indicates the names of software programs identified by software IDs. The "CURRENT VERSION" indicates the current versions of software programs, identified by software IDs, which can be realized by implementing software-updating modules. The "SOFTWARE-UPDATING MODULE" indicates software-updating modules for updating software programs identified by software IDs.

Figure 6:
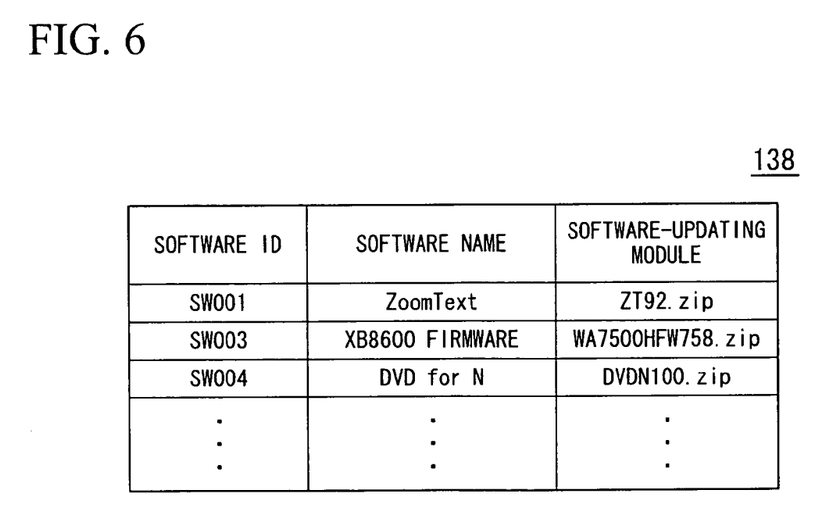
FIG. 6 shows an example of information stored in a software-updating module storage included in the managed device.

FIG. 6 shows an example of information stored in the software-updating module storage 138 in a table form. The software-updating module storage 138 stores a plurality of information elements in connection with various items, i.e. "SOFTWARE ID", "SOFTWARE NAME", and "SOFTWARE-UPDATING MODULE".

The "SOFTWARE ID" indicates identification codes for univocally identifying software programs installed in the managed devices 130. The "SOFTWARE NAME" indicates the names of software programs identified by software IDs. The "SOFTWARE-UPDATING MODULE" indicates software-updating modules for updating software programs identified by software IDs.

Figure 7:
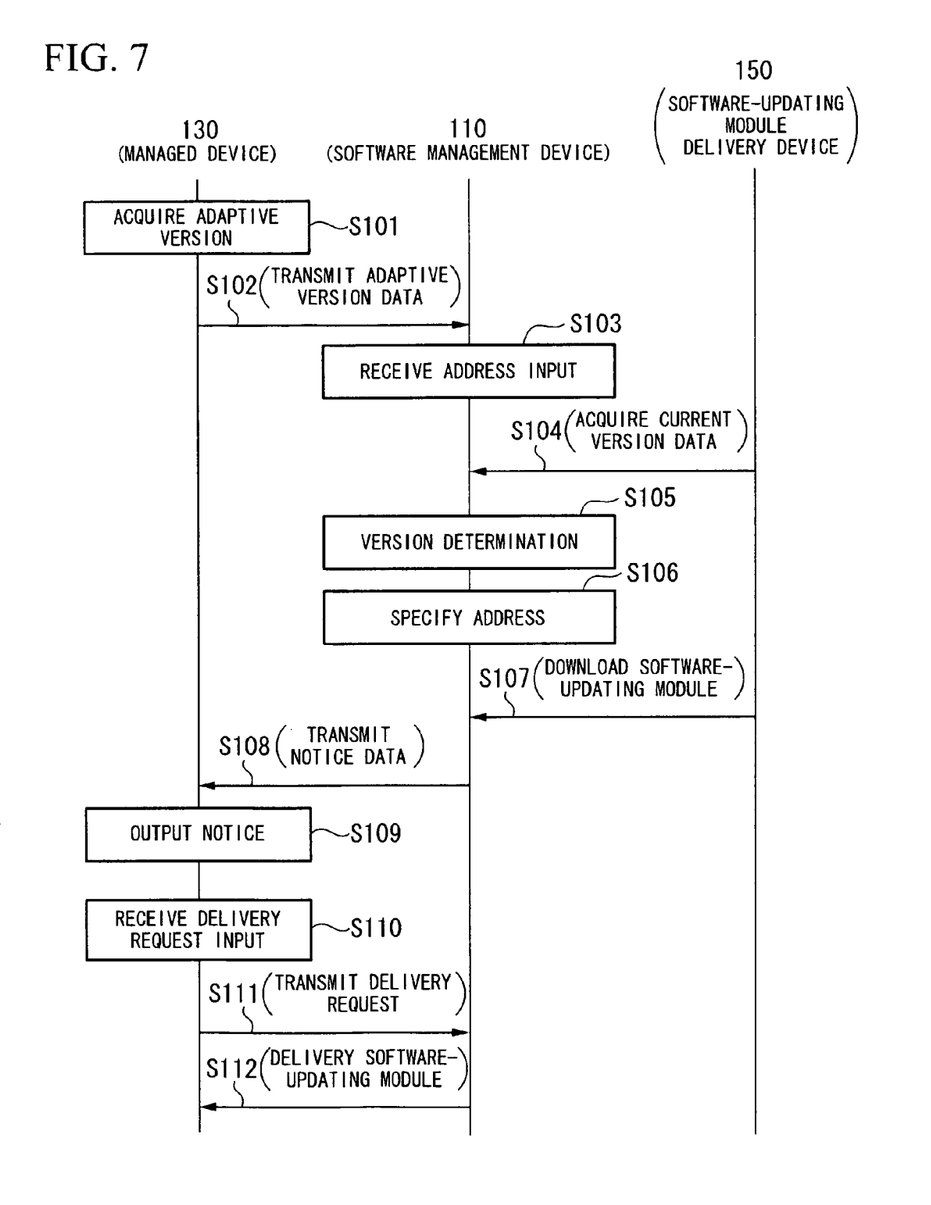
FIG. 7 is a flowchart showing a sequence of operations conducted by the software management device and the managed device in connection with a software-updating module delivery device.

FIG. 7 is a flowchart showing a sequence of operations conducted by the software management device 110 and the managed device 130 in connection with the software-updating module delivery device 150.

First, the adaptive version acquisition part 131 of the managed device 130 acquires the adaptive version of software installed in the managed device 130 (step S101). The adaptive version acquisition part 131 acquires the adaptive version of software at a specific timing, for example, at a timing of installing new software in the managed device 130 or at a scheduling timing. Herein, the adaptive version of software may include a driver of a peripheral device connected to the managed device 130. That is, the adaptive version acquisition part 131a of the managed device 130a acquires an adaptive version of a driver of the printer 191 as well. The adaptive version acquisition part 131 sends adaptive version data, representing the adaptive version of software installed in the managed device 130, to the adaptive version data transmission part 132.

Upon receiving adaptive version data from the adaptive version acquisition part 131, the adaptive version data transmission part 132 of the managed device 130 sends adaptive version data to the software management device 110 (step S102). Upon receiving adaptive version data from the adaptive version data transmission part 132 of the managed device 130, the adaptive version data reception part 111 of the software management device 110 stores the adaptive version of software, indicated by adaptive version data, in the software information storage 120.

An administrator of the software management device 110 operates an input device (e.g. a keyboard) to input URLs of delivery sources for delivering software-updating modules which are used for updating software programs installed in the managed devices 130. Thus, the address input reception part 112 of the software management device 110 receives addresses of delivery sources for delivering software-updating modules from the input device (step S103). Subsequently, the address input reception part 112 stores addresses in the software information storage 120. Thus, the software information storage 120 of the software management device 110 stores a plurality of information elements shown in FIG. 4.

The current version data acquisition part 113 of the software management device 110 acquires current version data, representing the current version of software which can be realized using software-updating modules in the managed device 130, from the software-updating module delivery device 150 (step S104). Subsequently, the current version data acquisition part 113 sends current version data to the version determination part 114.

Upon receiving current version data from the current version acquisition part 113, the version determination part 114 of the software management device 110 makes a decision as to whether or not the current version of software indicated by current version data (which is acquired by the current version data acquisition part 113) is later than the adaptive version of software indicated by adaptive version data (received by the adaptive version data reception part 111) with reference to the software information storage 120 (step S105). The version determination part 115 sends the decision result to the address identification part 115.

When the decision result of the version determination part 114 indicates that the current version of software is later than the adaptive version of software, the address identification part 115 of the software management device 110 specifies an address of a delivery source for delivering software-updating modules, which are used to update the adaptive version of software that are deemed later than the current version of software, with reference to the software information storage 120 (step S106). Subsequently, the address identification part 115 sends the address of a delivery source to the software-updating module download part 116.

Upon receiving the address of a delivery source for delivering software-updating modules, which are used to update the adaptive version of software that is deemed later than the current version of software, from the address identification part 115, the software-updating module download part 116 of the software management device 110 downloads software-updating modules from the software-updating module delivery device 150 serving as the delivery source specified by the address (step S107). Subsequently, the software-updating module download part 116 stores software-updating modules in the software-updating module storage 121. Thus, the software-updating module storage 121 stores a plurality of information elements (including software-updating modules) shown in FIG. 5. Additionally, the software-updating module download part 116 sends completion data, representing completion of downloading software-updating modules, to the notice data transmission part 117.

Upon receiving completion data from the software-updating module download part 116, the notice data transmission part 117 of the software management device 110 sends notice data, representing completion of preparing software-updating modules for updating the software installed in the managed device 130, to the managed device 130 with reference to the software information storage 120 (step S108).

Upon receiving notice data from the software management device 110, the notice data reception part 133 of the managed device 130 sends notice data to the notice output part 134. Upon receiving notice data from the notice data reception part 133, the notice data output part 134 sends the content of notice data to the output device (step S109). This notifies a user of the managed device 130 of completion of preparing software-updating modules for updating the software installed in the managed device 130.

In order to request a delivery of software-updating modules for updating software, a user of the managed device 130 operates the input device (e.g. a keyboard) to input a delivery request. Subsequently, the delivery request input reception part 135 receives a delivery request of software-updating modules input by the input device (step S110). The delivery request input reception part 135 sends the delivery request to the delivery request transmission part 136.

Upon receiving the delivery request from the delivery request input reception part 135, the delivery request transmission part 136 of the managed device 130 transmits the delivery request to the software management device 110 (step S111).

Upon receiving the delivery request from the managed device 130, the delivery request reception part 118 of the software management device 110 sends the delivery request to the software-updating module delivery part 119. Upon receiving the delivery request from the delivery request reception part 118, the software-updating module delivery part 119 of the software management device 110 reads software-updating modules for updating the software, indicated by the delivery request, from the software-updating module storage 121 so as to deliver them to the managed device 130 making the delivery request (step S112).

Upon receiving software-updating modules from the software management device 110, the software-updating module reception part 137 of the managed device 130 stores software-updating modules in the software-updating module storage 138. Thus, the software-updating module storage 138 stores a plurality of information elements (including software-updating modules) shown in FIG. 6.

As a result, the managed device 130 is ready to adopt software-updating modules which are forwarded from the software management device 110 and stored in the software-updating module storage 138.

As described above, the software management system 100 demonstrates various technological effects which will be described below.

When the software management device 110 receives adaptive version data, representing the adaptive version of software installed in the managed device 130, from the managed device 130, the software management device 110 downloads software-updating modules, which are used for updating the adaptive version of software with the current version of software, from the software-updating module delivery device 150. Thus, the software management system 100 is able to efficiently obtain software-updating modules which are used for updating any types of software programs installed in the managed devices 130.

The software management device 110 obtains current version data, indicating the software which is installed in the managed device 130 and which can be updated using software-updating modules, from the software-updating module delivery device 150, wherein it makes a decision as to whether or not the current version of software indicated by current version data is later than the adaptive version of software already installed in the managed device 130. When the decision result indicates that the current version of software is later than the adaptive version of software, the software management device 110 downloads software-updating modules, which are used for updating the adaptive version of software already installed in the managed device 130, from the software-updating module delivery device 150.

That is, the software management system 100 is able to selectively download software-updating modules, pertaining to the current version of software which is later than the adaptive version of software already installed in the managed device 130. Additionally, the software management device 110 delivers software-updating modules (which are downloaded from the software-updating module delivery device 150) to the managed device 130 installing the software which can be updated using software-updating modules. That is, the software management system 100 automatically carries out this download procedure so as not to impart an additional load to a user of the managed device 130 in downloading software-updating modules.

The software management device 110 transmits notice data, indicating completion of preparing software-updating modules for updating the software already installed in the managed device 130, to the managed device 130. That is, the software management system 100 automatically notifies the user of the managed device 130 of completion of preparing software-updating modules for updating the software already installed in the managed device 130.

The software management device 110 receives a delivery request, requesting a deliver of software-updating modules, from the managed device 130 so as to deliver software-updating modules to the managed device 130 making the delivery request. That is, the software management system 100 is able to deliver software-updating modules to the managed device 130 at a good timing preferred by the user of the managed device 130.

The software management device 110 specifies the address of a delivery source for delivering software-updating modules so as to download software-updating modules from the software-updating module delivery device 150 serving as the delivery source specified by the address. That is, the software management system 100 is able to reliably download software-updating modules from delivery sources which are publicly accessible on the Internet.

The software management device 110 receives the address of a delivery source input by an input device so as to store software information of the managed device 130 in connection with the address of the delivery source, whereby it is possible to specify the address of the delivery source for delivering software-updating modules which are used for updating the software of the managed device 130. That is, the software management system 100 is able to reliably download software-updating modules from delivery sources, which are specified by addresses input by an administrator of the software management device 110, irrespective of changes of addresses of delivery sources publicly accessible on the Internet.

Figure 8:
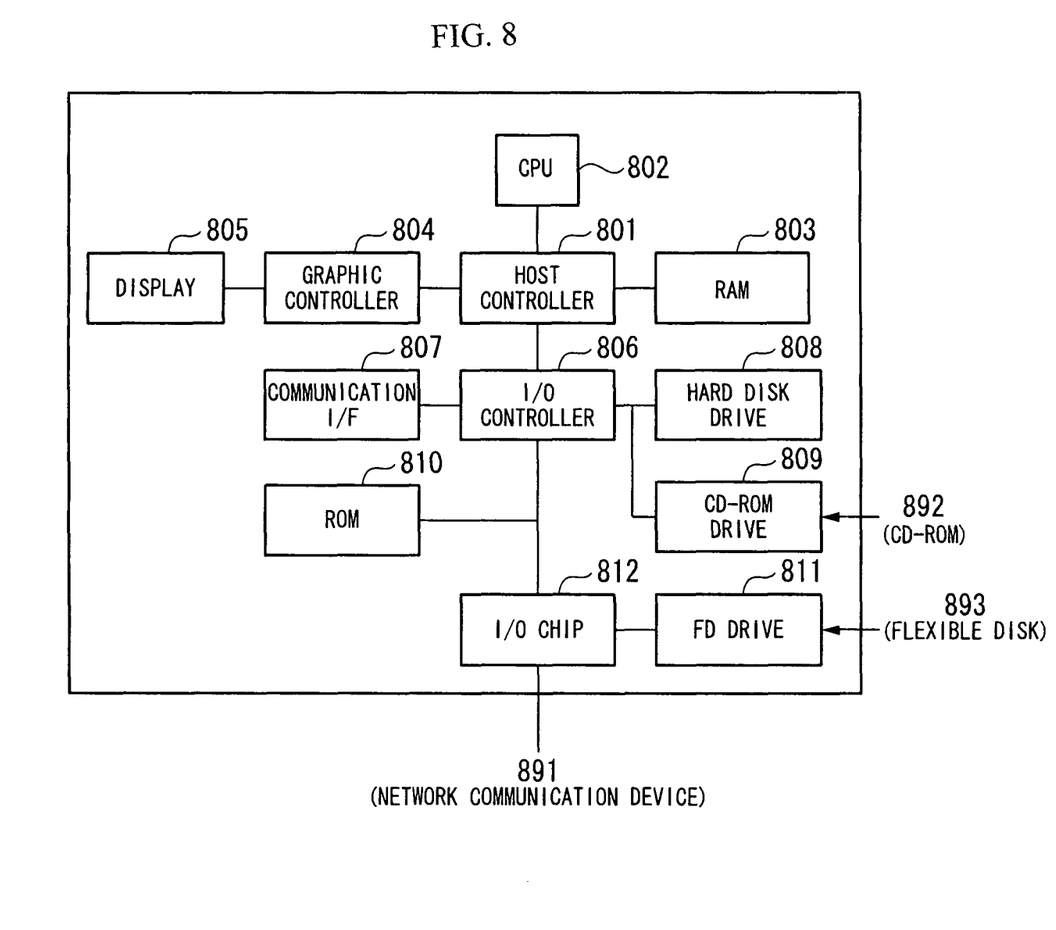
FIG. 8 is a block diagram of an electronic information processing device implementing the function of the software management device and the function of the managed device.

FIG. 8 shows the hardware configuration of an electronic information processing device which implements the function of the software management device 110 and the function of the managed device 130 with a computer. The electronic information processing device includes a CPU periphery, an input/output part, and a legacy input/output part. The CPU periphery includes a CPU 802, a RAM 803, a graphic controller 804, and a display 805, which are connected to a host controller 801. The input/output part includes a communication interface (I/F) 807, a hard disk drive 808, and a CD-ROM drive 809, which are connected to the host controller 801 via an input/output (I/O) controller 806. The legacy input/output part includes a ROM 810, a flexible disk (FD) drive 811, and an input/output (I/O) chip 812, which are connected to the I/O controller 806.

The host controller 801 connects the RAM 803 to the CPU 802 (which accesses the RAM 803 at a high transfer rate) and the graphic controller 804. The CPU 802 control various parts based on programs stored in the ROM 810 and the RAM 803. The graphic controller 804 receives graphic data, which the CPU 802 produces on a frame buffer in the RAM 803, so as to display graphic images on the display 805. Instead of the RAM 803, the graphic controller 804 may include the frame buffer (for storing graphic data produced by the CPU 802) therein.

The I/O controller 806 connects the host controller 801 to a relatively high-speed input/output device, i.e. the hard disk drive 808, the communication interface 807, and the CD-ROM 809. The hard disk drive 808 stores programs and data processed by the CPU 802. The communication interface 807 receives and transmits programs and data by way of a network communication device 891. The CD-ROM drive 809 reads programs and data from a CD-ROM 892 so as to provide them to the hard disk drive 808 and the communication interface 807 by way of the RAM 803.

The I/O controller 806 connects the ROM 810 to a relatively low-speed input/output device, i.e. the FD drive 811 and the I/O chip 812. The ROM 810 stores boot programs which are executed when the software management device 110 and the managed device 130 start their operations or other programs depending on the hardware configurations of the software management device 110 and the managed device 130. The FD drive 811 reads programs and data from a flexible disk (FD) 893 so as to provide them to the hard disk drive 808 and the communication interface 807 by way of the RAM 803. The I/O chip 812 is connected to the FD drive 811 and connectable to various types of input/output devices via parallel ports, serial ports, keyboard ports, mouse ports, or the like.

Programs executed by the CPU 802 are stored in storage media, such as the FD 893, the CD-ROM 892, and IC cards, and provided for the electronic information processing device of FIG. 8. Programs stored in storage media may be either compressed ones or non-compressed ones. Programs are read from storage media and installed in the hard disk drive 808; thereafter, programs are read by the RAM 803 and executed by the CPU 802. The CPU 802 executes programs to implement the processing of FIG. 7 in connection with the functionality of the software management device 110 (including the adaptive version data reception part 111, the address input reception part 112, the current version data acquisition part 113, the version determination part 114, the address identification part 115, the software-updating module download part 116, the notice data transmission part 117, the delivery request reception part 118, the software-updating module delivery part 119, the software information storage 120, and the software-updating module storage 121 shown in FIGS. 2, 4, and 5) and the functionality of the managed device 130 (including the adaptive version acquisition part 131, the adaptive version data transmission part 132, the notice data reception part 133, the notice output part 134, the delivery request input reception part 135, the delivery request transmission part 136, the software-updating module reception part 137, and the software-updating module storage 138 shown in FIGS. 3 and 6).

The foregoing programs can be stored in external storage media, other than the FD 893 and the CD-ROM 892, e.g. optical storage media such as DVD (Digital Versatile Disk) and PD (Phase Disk), magneto-optical storage media such as MD (Mini Disk), tape media, and semiconductor memory such as IC cards. Alternatively, it is possible to utilize network-connectible storage media such as hard disks and RAMs installed in server systems connectable to specified communication networks or the Internet, wherein programs can be stored in network-connectible storage media and provided for the electronic information processing device of FIG. 8.

Lastly, the present invention is not necessarily limited to the foregoing embodiment and its variations; hence, the present invention may embrace other modifications or design changes that fall within the scope of the invention as defined by the appended claims.

What is claimed is:

1. A software management device, including:
   a processor that is configured to manage a plurality of software programs installed in a plurality of managed devices in association with a plurality of software-updating module delivery devices;
   a software information storage that is configured to store a relationship between a plurality of software IDs, a plurality of addresses representing the plurality of software-updating module delivery devices, a plurality of adaptive versions of software, and a plurality of IDs representing the plurality of managed devices, wherein, upon receiving adaptive version data, indicating an adaptive version of software relating to each software ID, from each of the managed devices, the processor downloads a software-updating module used to update the adaptive version of software from each of the software-updating module delivery devices with reference to the software information storage;
   a delivery request data receiving unit configured to receive data, representing a delivery request for an update module used to update the software, from one of the managed devices; and
   an update module delivery unit configured to deliver the update module, which is downloaded by an update module download unit and is used to update the software, to said one of the managed devices, making the delivery request, specified by the data received in the delivery request data receiving unit,
   wherein the processor specifies an address of said each of the software-updating module delivery devices in connection with said each of the managed devices with respect to each software ID in the software information storage,
   wherein the processor downloads a software-updating module, which is used to update the adaptive version in said each of the managed devices, from said each of the software-updating module delivery devices whose address is specified by the processor,
   wherein the software information storage stores the plurality of addresses each input by an input device in connection with the plurality of software IDs, and
   wherein the processor specifies the address of said each of the software-updating module delivery devices, which delivers the software-updating module used to update the adaptive version of software in said each of the managed devices, with reference to the software information storage.

2. The software management device according to claim 1, wherein the processor acquires current version data, indicating a current version of software corresponding to the adaptive version of software currently installed in said each of the managed devices, from said each of the software-updating module delivery devices,
   wherein the processor makes a decision as to whether or not the current version of software is later than the adaptive version of software in said each of the managed devices, and
   wherein the processor downloads the software-updating module, which is used to update the adaptive version of software with the current version of software in the managed devices, from the software-updating module delivery devices, based on a decision result.

3. The software management device according to claim 1, wherein the processor transmits notice data, indicating completion of preparing each software-updating module, to said each of the managed devices, before updating the adaptive version of software.

4. The software management device according to claim 1, wherein, upon receiving a delivery request from said each of the managed devices, the processor delivers the software-updating module to said each of the managed devices.

5. The software management device according to claim 1, wherein the processor is configured to implement:
- an adaptive version data reception part that receives adaptive version data, representing an adaptive version of software, from said each of the managed devices; and
- a software-updating module download part that downloads the software-updating-module used to update the adaptive version of software in said each of the managed devices from said each of the software-updating module deliver devices in response to the adaptive version data with reference to the software information storage.

6. A software management method of managing a plurality of software programs installed in a plurality of managed devices in association with a plurality of software-updating module delivery devices, said method comprising:
- storing a relationship between a plurality of software IDs, a plurality of addresses representing the plurality of software-updating module delivery devices, a plurality of adaptive versions of software, and a plurality of IDs representing the plurality of managed devices in a software information storage;
- receiving adaptive version data, representing an adaptive version of software, from said each of the managed devices with respect to each software ID in the software information storage;
- downloading a software-updating module used to update the adaptive version of software from each of the software-updating module deliver devices in response to the adaptive version data with reference to the software information storage;
- receiving data, by a delivery request data receiving unit, representing a delivery request for an update module used to update the software, from one of the managed devices;
- delivering the update module, which is downloaded by an update module download unit and is used to update the software, to said one of the managed devices, making the delivery request, specified by the data received in the delivery request data receiving unit,
- specifying an address of said each of the software-updating module delivery devices in connection with said each of the managed devices with respect to each software ID in the software information storage; and
- downloading a software-updating module, which is used to update the adaptive version in said each of the managed devices, from said each of the software-updating module delivery devices whose address is specified,
- wherein the plurality of addresses is stored in each input by an input device in connection with the plurality of software IDs, and
- wherein the address of said each of the software-updating module delivery devices is specified, which delivers the software-updating module used to update the adaptive version of software in said each of the managed devices, with reference to the software information storage.

7. A non-transient computer-readable storage medium storing a software management program causing a computer to implement a software management method for managing a plurality of software programs installed in a plurality of managed devices in association with a plurality of software-updating module delivery devices with reference to a software information storage storing a relationship between a plurality of software IDs, a plurality of addresses representing the plurality of software-updating module delivery devices, a plurality of adaptive versions of software, and a plurality of IDs representing the plurality of managed devices, said software management method comprising:
- receiving adaptive version data, representing an adaptive version of software, from each of the managed devices with respect to each software ID in the software information storage;
- downloading a software-updating module used to update the adaptive version of software from said each of the software-updating module deliver devices in response to the adaptive version data with reference to the software information storage;
- receiving data, by a delivery request data receiving unit, representing a delivery request for an update module used to update the software, from one of the managed devices; and
- delivering the update module, which is downloaded by an update module download unit and is used to update the software, to said one of the managed devices, making the delivery request, specified by the data received in the delivery request data receiving unit,
- specifying an address of said each of the software-updating module delivery devices in connection with said each of the managed devices with respect to each software ID in the software information storage; and
- downloading a software-updating module, which is used to update the adaptive version in said each of the managed devices, from said each of the software-updating module delivery devices whose address is specified,
- wherein the plurality of addresses is stored in each input by an input device in connection with the plurality of software IDs, and
- wherein the address of said each of the software-updating module delivery devices is specified, which delivers the software-updating module used to update the adaptive version of software in said each of the managed devices, with reference to the software information storage.

* * * * *